United States Patent [19]

Madge et al.

[11] Patent Number: 4,905,230

[45] Date of Patent: Feb. 27, 1990

[54] TOKEN RING EXPANDER AND/OR HUB

[75] Inventors: Robert Madge, Chalfont St. Giles; David Woodfield, Walsall, both of England

[73] Assignee: Madge Networks Limited, Great Britain

[21] Appl. No.: 177,764

[22] Filed: Apr. 5, 1988

[30] Foreign Application Priority Data

Apr. 24, 1987 [GB] United Kingdom ............... 8709771

[51] Int. Cl.$^4$ ............................................. H04J 3/16
[52] U.S. Cl. .............................. 370/85.5; 340/825.05
[58] Field of Search ...................... 370/85, 86, 88, 89; 340/825.05

[56] References Cited

U.S. PATENT DOCUMENTS

| | | | |
|---|---|---|---|
| 4,587,651 | 5/1986 | Nelson et al. | 370/89 |
| 4,751,697 | 6/1988 | Hunter et al. | 370/86 |
| 4,757,497 | 7/1988 | Beierle et al. | 370/89 |

Primary Examiner—Joseph A. Orsino
Assistant Examiner—Frank M. Scutch, III
Attorney, Agent, or Firm—Wood, Herron & Evans

[57] ABSTRACT

In a communications network, a portable token ring hub which serves as a computer communications network for a plurality of computers and answers to the protocol requirements of the computer adapter cards configured to a token ring topology and which also serves as an expander with respect to an installed token ring LAN. The hub comprises a plurality of input/output ports including respective sockets into each of which an adapter card of a respective computer plugs, a trunk insertion unit having an outlet port to which a wander lead and a trunk coupling device plug are connected, and an internal token ring which is normally a closed ring but into which each of the said input/output ports and the outlet port are inserted by means of relay contacts in accordance with the requirements of the token ring protocol.

7 Claims, 6 Drawing Sheets

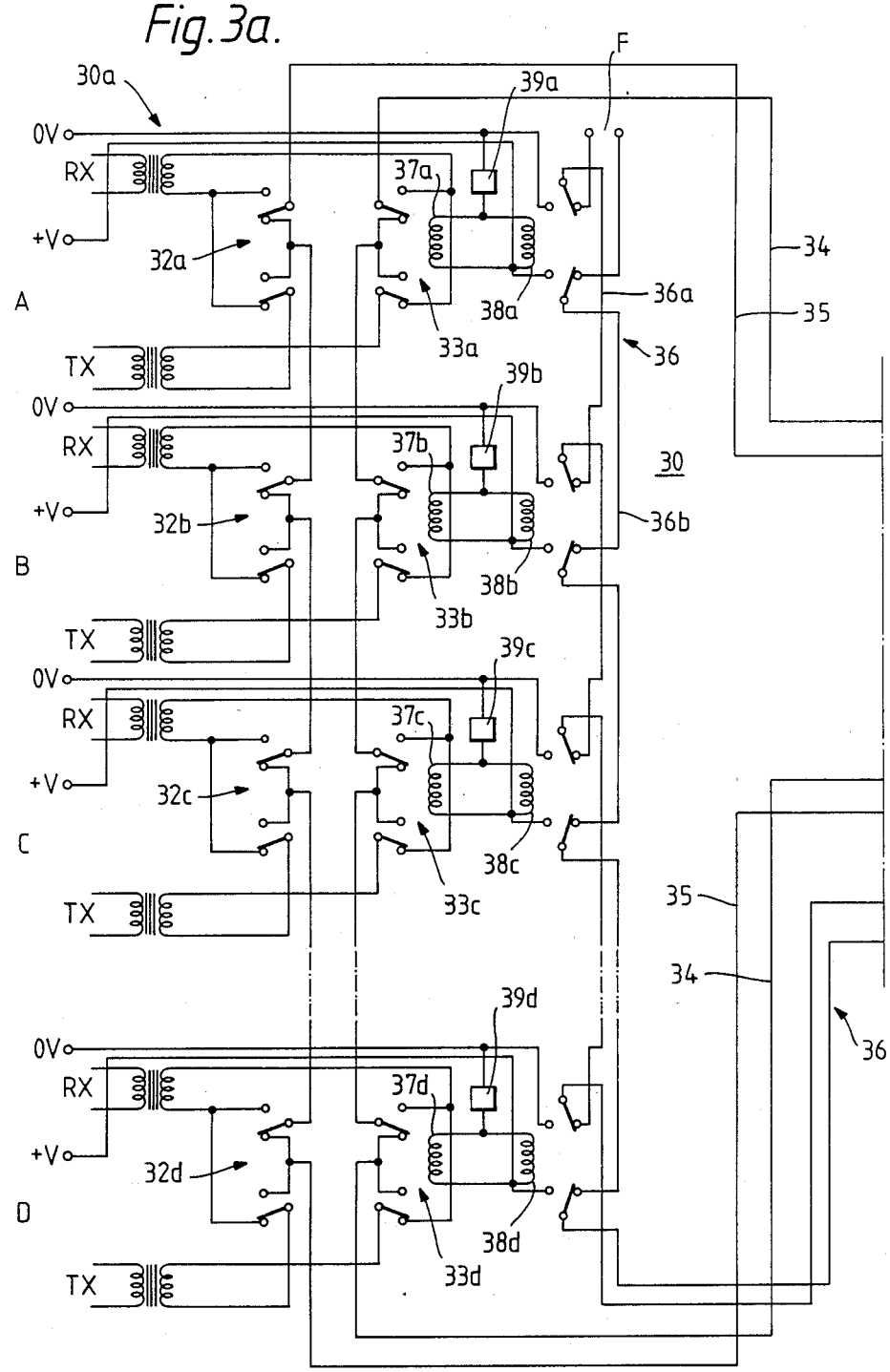

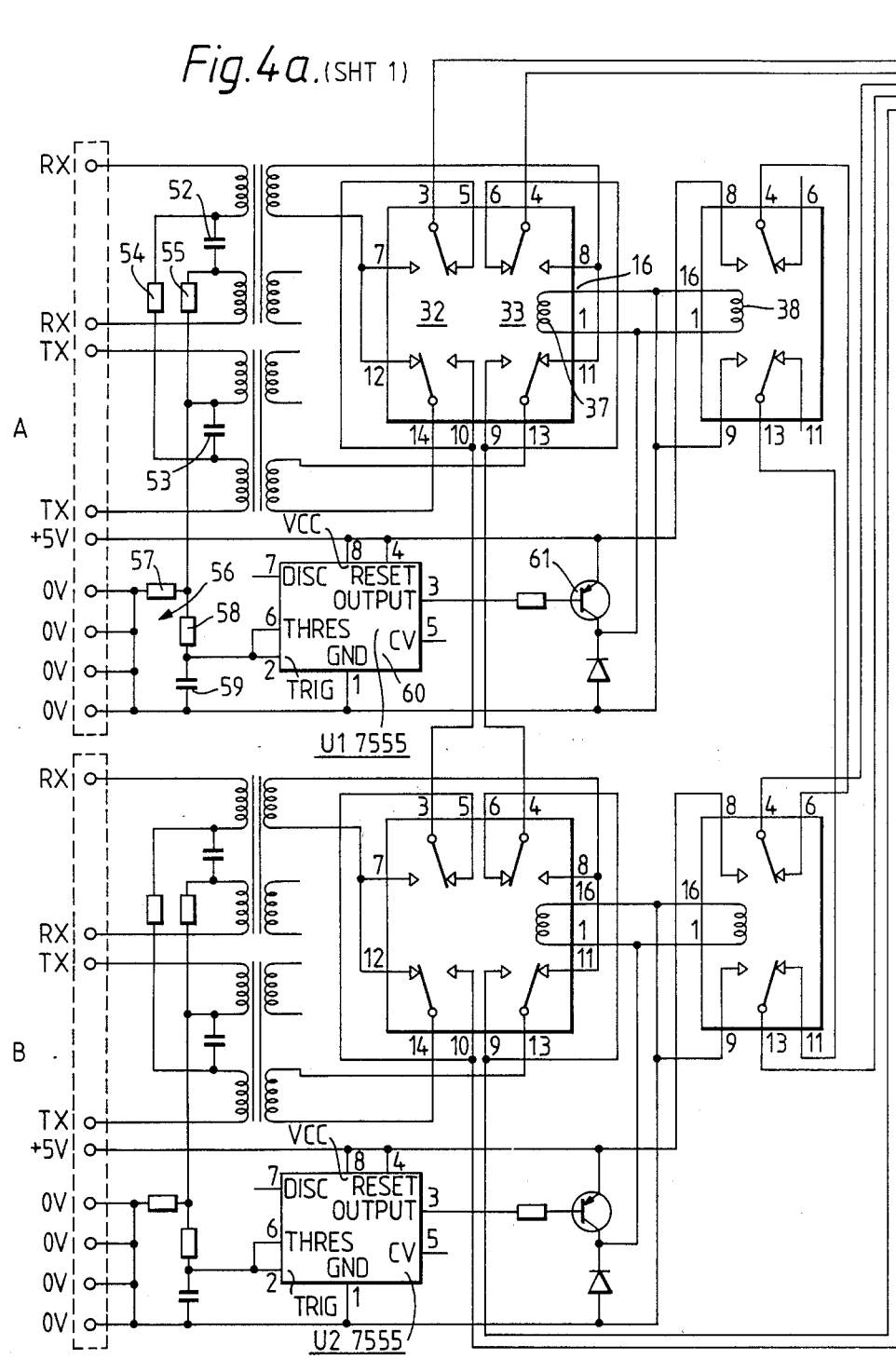
Fig.4a.(SHT 1)

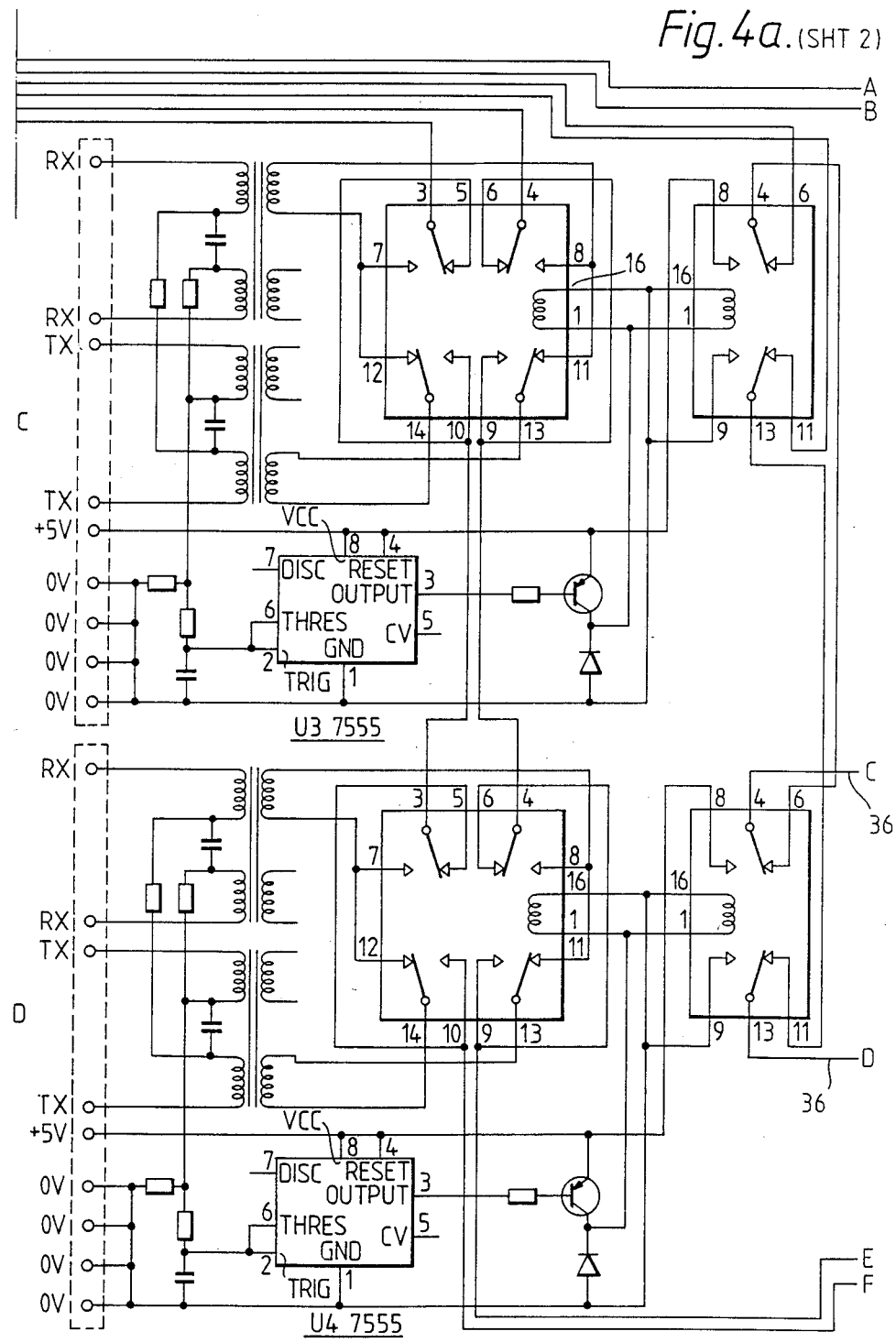
Fig. 4a. (SHT 2)

TOKEN RING EXPANDER AND/OR HUB

BACKGROUND OF THE INVENTION

This invention relates to trunk communications networks for computers and more specifically to trunk installations comprising local area networks (LANs).

The criteria involved in coupling fixed computer work stations into a main frame installation have been established over a long period. More recently, the advent of personal computers has led to the requirement for a trunking arrangement for multi-station communications with the facility of being able to withdraw any of the work stations from the network system by means of a simple plug and socket arrangement and to re-insert a station into the network at a different location, with the network being and remaining transparent to the computer of the work station and any computer communicating therewith. This concept has an analogy in the concept of the a.c. power ring main for domestic dwellings whereby power outlet sockets are installed in almost every room. As with the domestic ring main there are laid down standards, though because the field of the present invention is one which is rapidly and continuously evolving, many of the relevant Standards, including those pertaining to the field of the present subject matter, are still in draft form and not officially adopted. Nevertheless these Standards, or Drafts, as the case may be, have international recognition.

The above-described analogy does not provide any indication of the complex requirements of a computer trunk system, Computers cannot be inserted into a trunk system and communicate thereon in a random, disorganised manner, nor may they be inserted without regard to the integrity of the system as a whole. Thus when a work station is not contributing to any communication exchange through a trunk system or when the computer is disconnected from the trunk system the latter must remain available for instant use or re-use in all of its parts. Hence, trunk systems are protected by specific laid-down procedures which must be undergone when any computer is inserted into the trunk. These procedures are known as protocols. Protocols exist at several levels of the communication process and involve both hardware and software. On insertion of a work station into the trunk system, if the installation protocol for that work station is interrupted due to any cause, then the connection is not made, the trunk system automatically bypasses the work station, and its integrity is thereby preserved. Thus at the physical level, involving the insertion of a work station "plug" into the trunk "socket", a number of electrical tests are performed in sequence and only upon their successful conclusion is the work station actually electrically connected onto the trunk system, this being done by means of relay contacts in the socket the relay of which is responsive to a signal from the work station once the requirements of the protocol have been satisfied. When the work station is connected to the trunk system it becomes, so to speak, an integral part thereof.

By virtue of the afore-mentioned need of the trunk system to be carefully protected, that the latter takes on the aspect of a permanently fixed installation, again like a power ring main, and like any such installation, such an installation is not easily adaptable to changing needs with regard to the location and concentration of work stations. Indeed, in the case of computer work stations adaptation has to be shunned wherever possible to preserve the aforesaid integrity of the system.

Several trunking system topologies are known, the names of which are mostly self-explanatory, such as a star network configuration, master/slave network configuration, etc. The present invention relates most closely to, but is not of, species of local area networks (LANs) known as the token ring network topology. In a token ring topology the trunk itself comprises a normally closed ring around which are a number of entry points at which, by means of relay switching, work stations may be inserted into the system. Any computer can communicate with any other but by virtue of the aforesaid protocols, transmission takes place in packages and only one computer is allowed the use of the ring at any one time to transmit one such package and is regarded as the computer having, at that time, the so-called "token". When the package has been transmitted that computer relinquishes its monopoly of the ring and the token passes to another computer on the ring.

The token ring network is an example of the broader class of networks which are defined in the relevant Standards as "local area networks" (LANs) and, as the name suggests, they are particularly configured for use within a limited and confined circumference of such form whereby communication may take place directly between one computer and another without any need for using modems, etc. These LANs are covered by a family of I.E.E.E. Standards called IEEE.802 and there are corresponding ISO and BSI documents, though these are still in the draft stage. The subject of the "token ring" local area network is specifically covered by IEEE.802.5 and the corresponding International Standard Number is 8802.5, reference ISOTC 97 SC 6N 3244. The BSI document reference number is DD 136:1986.

The token ring local area network, as conceived and standardised, though catering for a plurality of work stations, is not adapted to cater easily for changing needs in the location of work stations, as may occur upon the relocation of office staff.

SUMMARY OF THE INVENTION

One solution to this problem again has its analogy in the domestic scene, that is a multi-way flexible extension socket, but again the analogy does not address the overriding requirement of protecting the integrity of a computer trunk system, the parameters of which are predetermined by the relevant standards. Therefore, what is now proposed is a portable "token ring" LAN expander which, like its analogous a.c. power extension socket, has an extension cable, a plurality of sockets at one end of the cable and a "plug" of sorts at the other end of the cable which will fit an existing standard token ring outlet socket. For the sockets there is proposed a set of sockets which are similar to normal token ring outlet sockets and to which a corresponding number of computers may be connected. Each work station connected to the "extension" and coupled into the permanent installation sees only a conventional token ring, whilst to the permanent installation it appears only that its ring has been expanded in circumference without any other effects.

Accordingly in this aspect of the invention there is provided a portable multi-port token ring expander having a plurality of expansion ports and a single outlet port in which each expansion port is adapted to receive a connector from a token ring adapter in an associated computer, and is individually responsive to, and takes part in the normal protocols, in which said outlet port is functionally matched to a standard token ring expansion socket, and all said expansion ports are adaptively coupled to the said outlet port.

According to another aspect of the invention there is provided a portable multi-port token ring hub having a plurality of outlets for connecting respective computers to said ring and to one another.

In yet a further aspect of the invention there is provided a portable token ring having a plurality of inlet/outlet ports for connection to adapter cards of respective computers and a further inlet/outlet port for connecting said portable token ring into an installed token ring LAN so as to expand the latter. In normal practice this latter installation would be a permanent installation in a building, or a number of buildings in close proximity, but all such installations may be given the capability of external connection through various types of links, known in the art, to other networks on a world-wide basis.

The invention also provides a portable communications network-hub device having an internal token ring and a plurality of input/output ports interconnected by the internal token ring, each for connection to an input/output port of a respective computer fitted with token ring adapter, wherein each of said device ports is constructed to be responsive to the token ring adapter of the associated computer and thereby take part in the standard computer protocols for communication on a token ring, as generated by the said computer.

These objects and features of the invention are further described hereinafter by way of example and with reference to the accompanying drawings.

BRIEF DESCRIPTION OF THE DRAWINGS

FIGS. 3a and 3b show an example of the token ring hub unit (30) in accordance with the invention.

FIGS. 4a and 4b show in more detail the circuit arrangement of the unit illustrated schematically in FIGS. 3a and 3b.

DESCRIPTION OF STANDARD TOKEN RING

Figure 1:
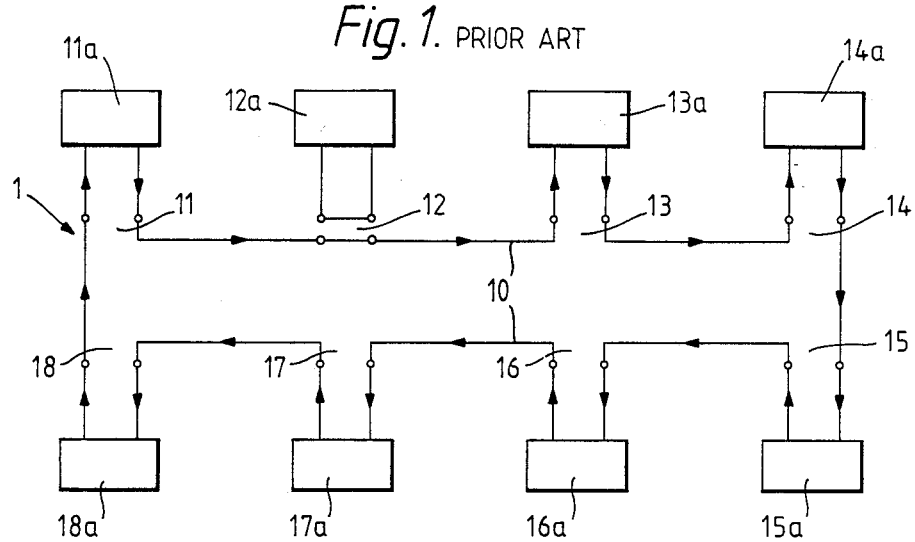
FIG. 1 (prior art) shows diagrammatically a local area network (LAN) implemented as a token ring.

Referring to the drawings, in FIG. 1 there is shown schematically the standard implementation of a simple token ring LAN 1 such as may be installed in a suite of offices. The details of the implementation may be derived from BSI DD 136, ISO 8082, or IEEE 802.5. The ring comprises essentially a looped or endless communication channel or bus 10. A bus outlet is provided in each office or work area, there being eight shown in all, comprising outlets 11-18. Corresponding with each outlet there is shown a work station or personal computer 11a-18a. As seen, work stations 11a and 13a-18a are all coupled into the ring and form part of it. Work station 12a, however, is bypassed and as a consequence is isolated from the ring. Whenever any of the work stations are electronically withdrawn from or are physically disconnected from the token ring LAN the associated ends of the bus are re-joined so that the ring is always continuous. This effect is shown more clearly in FIG. 2.

Figure 2:
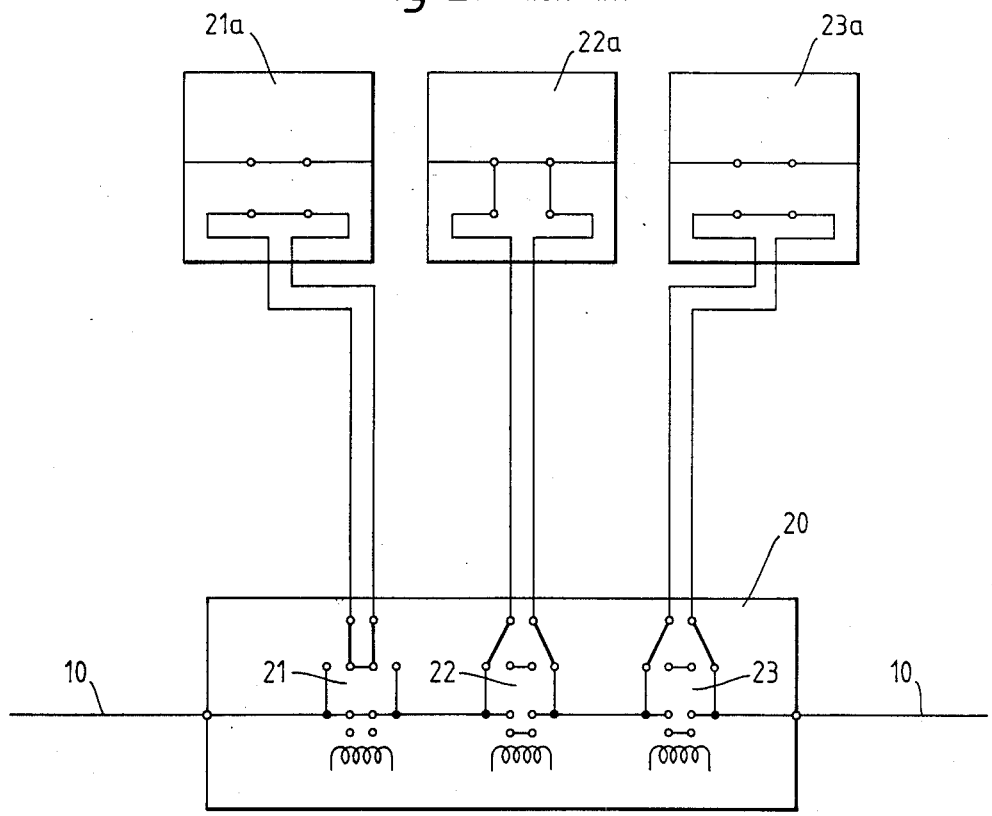
FIG. 2 shows a representative trunk coupling device (or socket outlet) for several work stations as used in the art in respect of token ring installations.

It is sometimes necessary to provide a plurality of outputs for the token ring LAN at the same location and a trunk coupling device 20, represented in FIG. 2, is specified for this purpose. Such a device may be thought of as a fixed three-way socket having the bus 10 connected to it on either side. Within the device are three socket outlets, 21, 22, 23, each of which is adapted to receive a standardised plug (not shown) by means of which a respective computer may be coupled into the ring. The trunk coupling device has three computers (21a-23a) connected to it, each comprising a separate work station using the token ring LAN to communicate with one another and/or to other work stations around the ring. Computer 21a is offline and hence, though physically connected to the trunk coupling device, there is no electrical connection into the bus 10, which is shown as bypassing this computer. The computer 22a has the "token", being actively connected onto the bus 10 and transmitting thereto. The bus is therefore diverted through the computer transmitter and receiver data input/output lines. Computer 23a is online and in a ready state but is not transmitting at the instant shown. It receives from the bus 10 and repeats back onto it in both directions. As in the previous instance, the bus is diverted through the computer input/output circuits. In actuality the circuits are normally coupled through transformer windings and there is no direct physical electrical connection between the computer circuits and the LAN data lines.

DETAILED DESCRIPTION OF EMBODIMENTS OF THE INVENTION

Figure 3B:
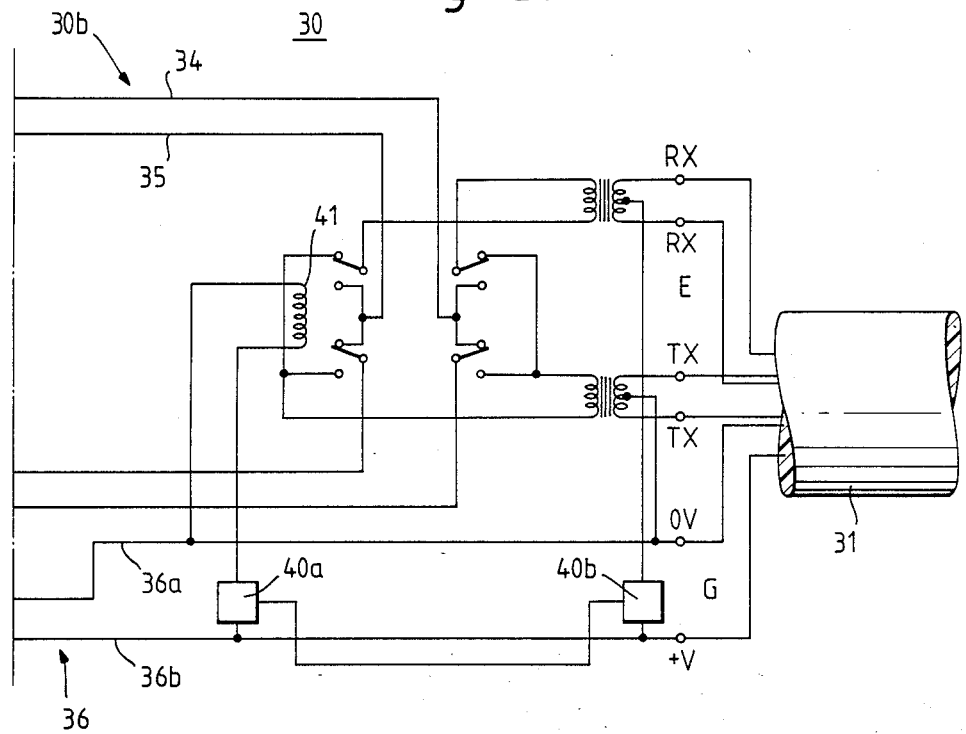

FIGS. 3a and 3b show an example of the token ring hub unit 30 in accordance with the invention. It comprises two electrically connected circuits 30a and 30b housed within a unitary casing (not shown) and a wander lead 31 which is connected at one end to an outlet port E of the circuit 30b and at its other, free, end to a single multi-terminal connector (not shown), which plugs into a trunk coupling device. The circuit of FIG. 3a comprises a multi-socket expander. The circuit of FIG. 3b comprises the expander outlet, also called "a trunk insertion unit", interfacing the port E.

In its offline, closed down, condition the unit 30 comprises two separate closed-loop, or endless, lines 34 and 35, each of which passes successively through socket areas A-D of expander 30a and the trunk insertion unit interfacing port E. There is also a biasing signal direct current line 36 comprising leads 36a and 36b which may be traced from an open circuited end at F through to the trunk insertion unit at G. This additional line also passes successively through each socket area A to D. Both the connector which plugs into a trunk coupling unit and the sockets of the expander are standardised elements and are comparable in size with standard domestic telephone plug and socket connectors. The unit 30 can be of quite modest proportions, well adapted to being carried around and for being moved from one room, or location, to another. As shown, it has four sockets, but it may be provided with more sockets or fewer than four. In use the token ring hub may serve as a "stand alone" device, i.e. as a portable token ring not having any connection to a LAN and permitting a limited number of work stations in the same locality to communicate with each other in the manner of a normal token ring. Alternatively it may serve as an expander, permitting several work stations grouped relatively closely together to be flexibly located and all have access to a token ring LAN as well as to one another. In principle, and subject to the limitations laid down for token ring topology, token ring hubs according to the invention can also be piggy-backed.

Each socket area A-D includes a respective physical socket (not shown) for receiving a connector (also not shown) with the necessary provisions for electrical contact and each essentially comprises a multi-pole ganged relay actuated set of contacts 32(a-d), 33(a-d) and an associated relay 37(a-d). Associated with each socket area is an auxiliary relay circuit, including relays 38a-d, each of which is connected in parallel with respective relays 37a-d, by means of which a direct current biasing signal may be switched onto the line 36. Each socket area has associated therewith a transmitter isolating transformer TX and a receiver isolating transformer RX the secondary windings of which are respectively connected under offline conditions in a closed loop through the said contacts of the associated relay 37a-d.

Though not shown, it will be understood that the primary windings of the aforesaid transformers are coupled via input/output circuits of the respective computers to standard adapter cards located in the respective computers. These adapter cards are responsible, among other things, for instituting the protocol procedures at the physical level involving the connection of the respective computes onto a token ring. Before effective connection of a computer to such a token ring is permitted these cards automatically carry out a standard sequence of tests to ensure that the electrical connections onto the ring will comply with the Standards specifications.

The adapter cards have a precisely similar function with respect to the connection of respective computers onto the present device. In the course of the aforesaid tests a signal is applied by the adapter card to the direct current signal terminals marked OV, +V, at the respective socket. This signal is detected by the respective switch circuit (39a-d) and at the end of a prescribed period, determined by a respective timer in the switch circuit (39a-d) a bias signal is applied to the respective parallelly connected relays. This has the effect of switching the secondary windings of the transmitter receiver transformers coupled to the input/output circuits of the computer, into the lines 34, 35, and it also connects the bias signal which is provided by the associated computer adapter card onto the signal line 36. In the event that the token ring hub 30 is already functionally coupled to a token ring LAN as a consequence of another computer being previously coupled to the hub, the computer is then inserted into the token ring LAN via the trunk insertion unit 30b. In the event that the connection to the token ring LAN still has to be established, the biasing voltage at G, under the control of protocol testing circuitry 40a and b in the trunk insertion unit 30b then signals the socket relay in the trunk coupling device 20 to make the connection onto the token ring LAN and also trips relay 41 in the trunk insertion unit 30b so as to connect the hub ring to the ring of the LAN. Suitable circuit arrangements provided in the trunk insertion unit 30b carry out appropriate tests essential in order to satisfy the protocol requirements.

In FIGS. 4a and b is shown a circuit implementation of the token ring hub unit of FIG. 3. Though illustrated with four work station connection points or "socket" areas A-D (in FIG. 4a) the unit may comprise fewer or more such circuits. As these areas are all identical, only the circuitry associated with Area A is described in the following.

It will be seen that the two primary windings of the transmitter and receiver transformers are each split in half, the two halves of each winding being coupled serially together by a respective capacitor 52, 53. The outer halves of the two primaries are joined serially through a resistor 54. The two inner halves are connected, one additionally through a resistor 55, to a voltage ramp circuit 56 comprising resistors 57, 58 and capacitor 59. The output of the ramp circuit inputs a trigger circuit 60 which, together with the ramp circuit 56, acts as a timer. A switch circuit 61, responsive to the timer output, sends an operating signal to the relays 37, 38 when the timer times-out in the event that a voltage is present on the +5V power line.

Figure 4B:
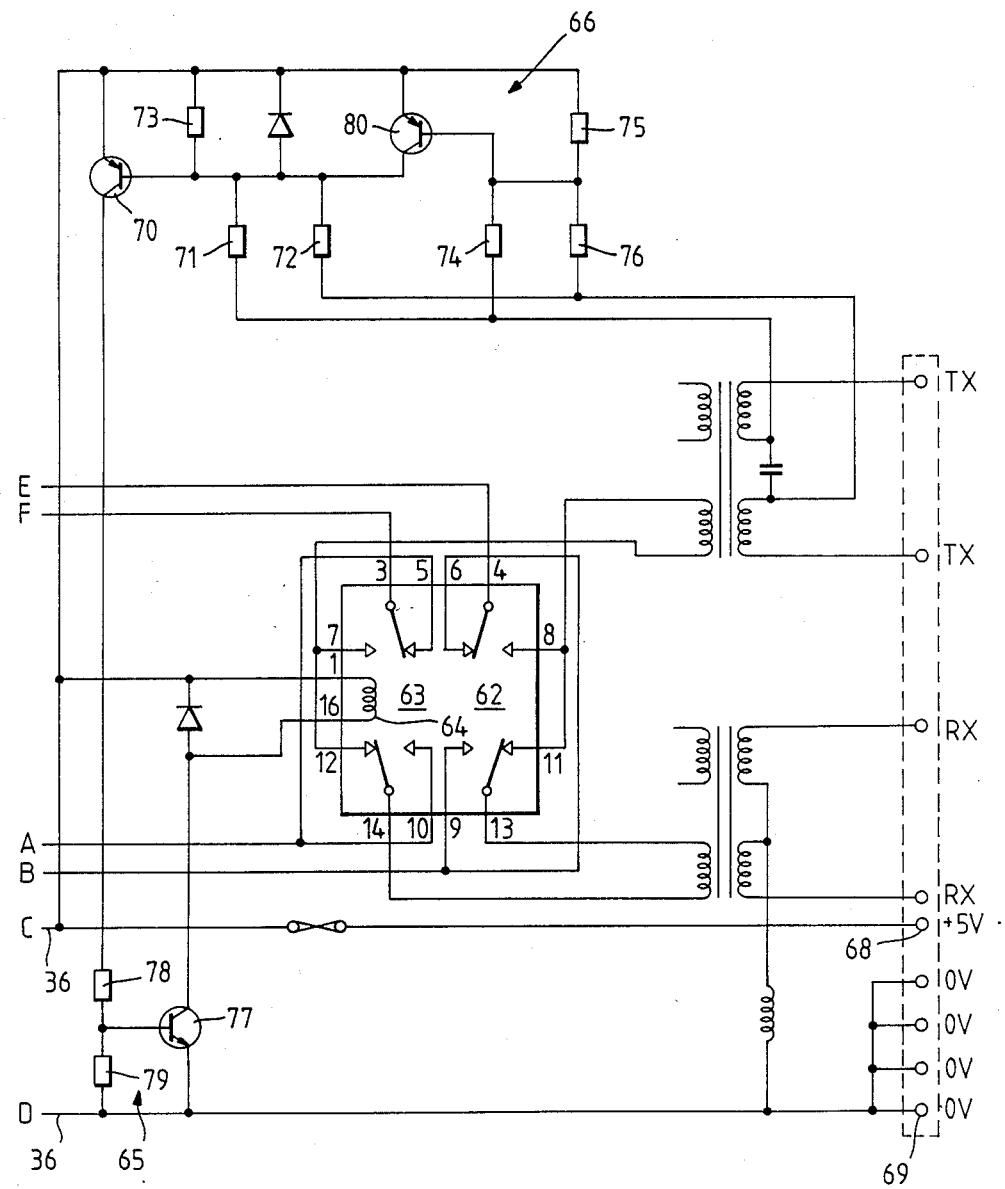

Referring to FIG. 4b, which shows the trunk insertion unit, a relay switching circuit 62, 63, similar to the relay switching circuits 32, 33 of the "sockets" but rotated electrically through 180°, normally patches the internal ring so that each loop thereof is closed at that location without any external coupling. On operation of the switches, however, when the relay coil 64 is energised the loops are opened to receive the primary windings of the respective transmitter and receiver input/output coupling transformers. Relay winding 64 is responsive to a switching circuit 65 which is controlled by a protocol circuit 66. The bias signal line 36 incorporates a fuse 67 and is permanently coupled to outlet connectors 68, 69.

Protocol circuit 66 receives a bias signal from the line 36 upon successful insertion of a work station into one of the sockets A-D and operates to inject a bias signal into a relay circuit (which corresponds to the relay circuits of the aforesaid sockets) in the trunk coupling device to which the trunk insertion unit is connected.

In the inoperative state of the token ring hub the relay switches 32, 33, of sockets A-D complete a balanced ring network through terminals 4-6 and 3-5, and also feed a balanced a.c. signal from the connector TX pins to the respective RX pins through terminals 13-11 and 14-12 and via the isolating transformer. With the exception of the ring path through the switches 62, 63 of the trunk insertion unit the components of the latter play no part in the operation of the token ring hub when the latter is serving as a stand-alone device.

Before a computer intended for connection onto a token ring inserts itself into the ring its adapter card performs a series of tests. These tests are carried out with respect to the sockets A-D of the token ring hub. Thus the respective adapter card drives the TX pins with an a.c. signal and checks that the a.c. signal is returned on the RX pins. This test checks the cable between the adapter card and the local ring hub, the transmitter and receiver transformers of the latter, the capacitors 52, 53, and the normally closed contacts 32, 33. If this test is successful the adapter card then supplies a positive supply of approximately +5V, to both transmitter pins TX, and it measures the currents drawn by the resistors 54, 55, which return to ground via the RX pins of the receiver transformer. If the currents drawn by the resistors are within defined limits, implying there are no breaks, or shorts, in any of the cable cores, the voltages are maintained on the TX pins and the voltage at the output of the ramp circuit climbs as the capacitor 59 charges. After 70 milliseconds the output of the trigger circuit 60 goes low, switching on the switch circuit 61 which sends a bias signal to the relays 37, 38. This causes the switches 32, 33 to operate, breaking the internal ring at this location, breaking the a.c. loop from the TX pins to the RX pins and thus inserting the computer into the internal ring. The adapter card continues to monitor the currents through resistors 54, 55 all the time that the computer is inserted and removes the voltage supply on the TX pins if it finds any irregularity. When the voltage is removed, either because of fault conditions or normal removal of the computer from the ring, capacitor 59 discharges through resistor 58 and after 70 milliseconds the relay drops out. Capacitors 52 and 53 are used to isolate the two d.c. test current paths and act as low impedances to signal frequencies.

When the trunk insertion unit is connected into the socket of a trunk coupling device the token ring hub then operates as an expander in relation to the token ring LAN to which it appears as though it were an adapter card. The bias signal line 36 passes the bias signal voltage level to the output connector pairs 68, 69 and also to the test circuit 66. A voltage on connector pins 68, 69 will be present whenever one or more of the computers is connected to the token ring hub.

When the trunk insertion unit is connected there will be resistors present between the TX and RX pins. Direct currents will be drawn through resistors 71, 72 in circuit 66 which turns on the transistor 70 if it is above 1.3 milliamps. Resistors 71, 72 provide current limiting of around 100 milliamps per line. Resistor 73, in combination with resistors 74, 75 and 76, set the current threshold for transistor 70 to turn on. When the latter turns on, transistor 77 is switched on as a consequence of the current drawn through resistors 78, 79 and the current through transistor 77 energises the relay 64. If the current drawn from either TX pin is excessively high, transistor 80 will be turned on, which turns off transistors 70, 77, and prevents the relay 64 from pulling in.

Thus relay 64 is energised if the trunk insertion unit is connected into a socket of a trunk coupling device and the correct current is being drawn from both of the TX pins and if one or more of the computers are successfully inserted into the sockets of the local ring hub. The current provided from the TX pins will energise the relay 64 and the token ring hub will be inserted into the main token ring of the LAN as if it were itself an adapter card.

The bias voltage level is also fed out into the trunk coupling unit to trip the socket relay of that unit. The line 36 is fused to prevent damage to the relay contacts in the event of a direct short.

I claim:

1. In a computer communications network the improvement comprising a portable communications network-hub device having a plurality of input/output ports, each for connection to an input/output port of a respective computer fitted with a token ring adaptor, a trunk insertion unit having an electrical connector for adaptively coupling the device into an expansion port of a local area network (LAN) implemented as a token ring, and an internal token ring adapted to pass serially through each of the device ports and the trunk insertion unit, wherein each of said device ports comprises first and second switch means and control means therefor, said first switch means normally closing the internal token ring for isolating the latter from the associated device port, said first switch means for inserting a computer connected to the associated device port into said internal token ring when operated by said control means, and said second switch means normally closing a bias signal line for isolating the latter from an associated device port, which bias signal line extends from the open circuit at one end through each said device port to output terminals in said electrical connector of said trunk insertion unit, said second switch means for connecting said bias signal line to a bias voltage source in the connected associated computer when operated by said control means, and wherein said control means in each port is adapted to be responsive to the token ring adaptor of said associated computer whereby the device port to which the computer is connected takes part in the standard computer protocols for communicating on a token ring, at the completion of which protocols said first switch means are operated so as to install the said associated computer into said internal token ring and said second switch means are operated so as to provide a bias voltage signal provided by the associated computer on said output terminals in the electrical connector of the trunk insertion unit.

2. A network-hub device according to claim 1 wherein each of its input/output ports has the physical form of a standard token ring expansion socket.

3. A network-hub device according to claim 1 wherein each said input/output port comprises transmitter and receiver isolating transformers, each having primary and secondary windings, said transformers being for connection via the primary windings thereof to the respective transmitted and receiver circuits of the associated computer, and said first switch means comprises first change-over contact means between the secondary windings of the transformers and the said internal token ring, said contact means being responsive to a signal from the adaptor of the associated computer and arranged to open the internal token ring when the port is active and thereby serially insert the said secondary transformer windings into the internal token ring and being further arranged when the port is inactive to close and isolate the token ring from the said secondary transfer windings and to connect the latter serially in a balanced impedance loop.

4. A network-hub device according to claim 3 wherein said trunk insertion unit further comprises simulating means connected to said bias signal line and to signal line connectors in said trunk insertion unit connector, said simulating means being adapted for sensing the coupling of said connector to said expansion socket of said LAN and being responsive to said bias voltage signal for simulating the protocol functions of the said token ring adaptor of a computer.

5. A network-hub device according to claim 4 wherein said trunk insertion unit connector has the physical form of a plug to fit a standard token ring expansion socket.

6. A network-hub device according to claim 4 wherein said second switch means comprises second change-over contact means.

7. A network-hub device according to claim 6 wherein said trunk insertion unit comprises transmitter and receiver isolating transformers having primary windings connected to said internal token ring by third change-over contact means and secondary windings connected to transmitter and receiver terminals in said electrical connector of said trunk insertion unit, said third contact means being electrically disposed in said token ring such that when all said device input/output ports are inactive contacts in the trunk insertion unit close the internal token ring and connect said transformer primary windings serially in a balanced impedance loop, and when any input/output port is active contacts in the trunk insertion unit are switched so that the internal token ring is opened and said transmitter and receiver transformer primary windings are serially connected into the ring.

* * * * *